Nov. 10, 1925.

R. CROWDER 1,560,667

APPARATUS FOR MEASURING AND DISPENSING LIQUIDS

Filed July 31, 1923

R. Crowder
*Inventor* by F. A. Witherspoon
*Attorney*

Patented Nov. 10, 1925.

1,560,667

UNITED STATES PATENT OFFICE.

RAYMOND CROWDER, OF RALEIGH, NORTH CAROLINA.

APPARATUS FOR MEASURING AND DISPENSING LIQUIDS.

Application filed July 31, 1923. Serial No. 654,927.

*To all whom it may concern:*

Be it known that I, RAYMOND CROWDER, a citizen of the United States, residing at Raleigh, in the county of Wake and State of North Carolina, have invented certain new and useful Improvements in Apparatus for Measuring and Dispensing Liquids; and I do hereby declare the following to be a full, clear, and exact description of the invention, such as will enable others skilled in the art to which it appertains to make and use the same.

This invention relates to an apparatus adapted for the general measuring and dispensing of gasolene, but especially adapted for measuring and dispensing the same to automobilists, and to other users. It has for its object to provide a device of this nature which will be comparatively inexpensive to manufacture, certain in operation, and more efficient in use than those heretofore proposed.

With these and other objects in view, the invention consists in the novel details of construction and combinations of parts more fully hereinafter disclosed and particularly pointed out in the claims.

Figure 1:
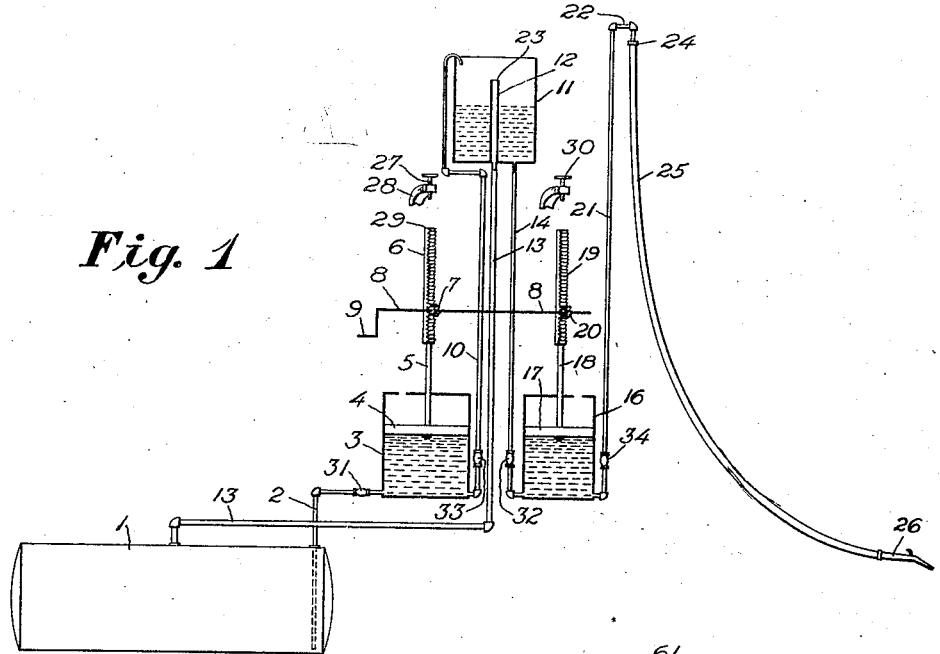
Figure 2:
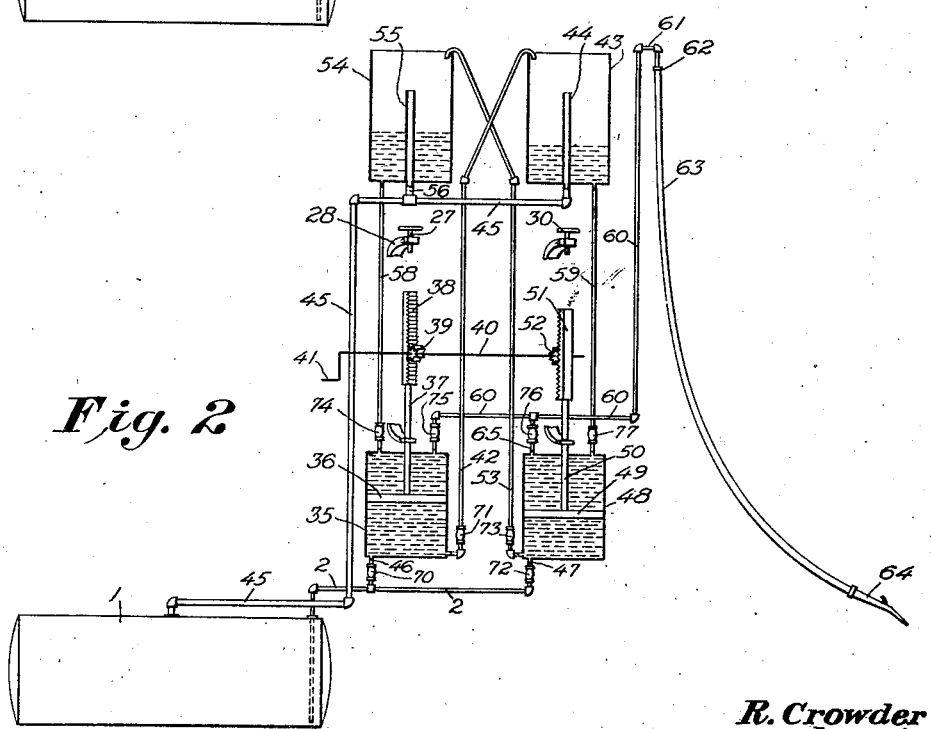

Referring to the accompanying drawings forming a part of this specification, in which like numerals designate like parts in all the views:

Figure 1 is a diagrammatic partially sectional view of an apparatus made in accordance with this invention; and Figure 2 is a similar view of a somewhat modified form of apparatus.

1 indicates any suitable supply of gasolene or other liquid, usually in the form of a tank, 2 a suction pipe leading therefrom and 3 a pump cylinder provided with a piston 4, a piston rod 5, and any suitable means of reciprocating said piston, which in Figure 1 takes the form of a rack 6, a pinion 7, a shaft 8, and an operating handle 9. Leading from said cylinder 3 is a pipe 10 delivering into a measuring tank 11, which is provided with an overflow pipe 12, connected as by the drain pipe 13 to the tank 1, all as will be clear from the drawings. Leading from the bottom of said measuring tank 11 is the delivery pipe 14 joining the measuring cylinder 16, provided with the piston 17 having the piston rod 18 operated by any suitable means, as for example the rack 19, associated with the pinion 20, and a continuation of the shaft 8 above mentioned. Leading from said measuring cylinder 16 is the delivery pipe 21, carried to a point 22 located above the top 23 of the overflow pipe 12. Joined to said pipe 21 as at the point 24 is the delivery hose 25 provided with any suitable nozzle 26, but preferably of the well known valved type to prevent drip.

In operation, the dispenser would turn the shaft 8 thus causing the pistons 4 and 17 to rise and fall simultaneously. The piston 4 on its rise sucks in a quantity of liquid which depends upon the distance the piston travels and the latter is governed by the set screw 27 associated with the stationary member 28. This set screw contacts with the upper end 29 of the rack 6, and thus limits the upward movement of piston 4. On the down stroke of the piston 4 the liquid sucked therein is forced up through the pipe 10 and over the upper edge of the measuring tank 11. The set screw 27 is preferably so adjusted as to cause the piston 4 to suck in a quantity of fluid sufficient to slightly more than fill the tank 11 to a point above the end 23 of the overflow pipe 12, thus insuring that at every down stroke of the piston 4 the tank 11 will with certainty be filled up to a predetermined point. Any surplus fluid that may be thus delivered into the tank 11 readily flows down through the pipes 12 and 13 back into the tank 1. The result is that whenever the piston 4 is down to its limit of travel, the tank 11 is filled accurately with a predetermined quantity of fluid.

The piston 17 rises with the piston 4 and when it reaches its upward limit of travel, which is likewise determined by a screw 30 or by other suitable means, the cylinder 16 will be accurately filled with a predetermined amount of fluid, as will also the pipe 14 leading from the tank 11. In other words, when the pistons 4 and 17 are raised to their fullest extent, both cylinders 3 and 16 will contain predetermined quantities of fluid, and when the pistons 4 and 17 descend in the manner above disclosed, a predetermined quantity of fluid will be forced out of the cylinder 3 into the tank 11, and simultaneously therewith a predetermined quantity of liquid will be forced out of the cylinder 16 through the pipe 21 and into the hose 25, as will be clear from the drawings.

On the descent of the piston 4, the check valve 31 prevents the liquid from passing back into the tank 1, and on the descent of the piston 17 the check valve 32 prevents the liquid from passing back into the tank 11. On the other hand, the check valve 33 permits liquid to pass out of the cylinder 3 into the pipe 10, but does not permit liquid to flow from said pipe 10 back into said cylinder 3. The same remarks apply to the check valve 34 associated with the cylinder 16 and pipe 21. In other words, the pipe 10 above the check valve 33 will be kept constantly full of liquid, the pipe 14 above the check valve 32 will be kept constantly full of liquid, and the pipe 21 beyond the check valve 34 as well as the hose 25 up to the valve (not shown) in the nozzle 26 will be kept constantly full of liquid. It thus results that each of the displacements of the piston 4 will deliver the same quantity of liquid into the tank 11, and the displacements of the piston 17 will each deliver the same quantity of liquid from the nozzle 26. The volume of a displacement of piston 4 being greater than the volume of a displacement of piston 17, as indicated in the drawings, ample provision is made for the well known losses in devices of this character, due to leakage, evaporation, etc., and therefore, the customer can be convinced that he is getting his full measure. Especially is this true when the tanks 11 are made transparent as is usually the case.

Further, by making the displacement of piston 17 accurately of the predetermined volume to be delivered to the customer, say, 1 gallon, 5 gallons, or 10 gallons, it serves as a check on the measuring tank 11. That is, if for any reason said tank 11 fails to empty to the last ounce, or through evaporation or leakage since the last filling, it is not as full as it ought to be, then we have the contents of pipe 14 to make up for such losses and to completely fill the cylinder 16, so that for any up stroke of the piston 17, no matter how long the time since the preceding up stroke, the customer is certain of getting his full measure. This last named result is still further assured due to the pipe 21 being always full and its upper end 22 being located at a point higher than tank 11 to prevent liquid from siphoning out of the same.

In the somewhat modified form of the invention shown in Figure 2, the principle of operation is the same as in Figure 1, but double acting pumps are disclosed, and two measuring tanks are provided. That is to say, the numerals 1 and 2 represent a liquid supply and a suction pipe respectively, as in the previous case, while 35 indicates a pump cylinder provided with a piston 36, a piston rod 37, a rack 38, a pinion 39, and operating shaft 40, a handle 41 for operating the same, a delivery pipe 42, emptying into the measuring tank 43, provided with an overflow 44, and a drain pipe 45, leading back to tank 1. To the suction pipe 2, there is joined a suction pipe 46, leading into the cylinder 35; and also to said suction pipe 2 is joined the suction pipe 47 leading into the cylinder 48, provided with the piston 49, a piston rod 50, the rack 51, and operating pinion 52. Connected to the cylinder 48 is the delivery pipe 53, emptying into the measuring tank 54, provided with the overflow pipe 55, connected to the drain pipe 45, as at 56. Leading from the tank 54 is the delivery pipe 58, entering the top of the cylinder 35 as shown, and leading from the tank 43 is the delivery pipe 59, connected to the top of the cylinder 48, as shown. Leading from the top of the cylinder 35 is the delivery pipe 60, which extends to the point 61 located above the upper ends of the overflow pipes 44 and 55, as shown. Leading from the said pipe 60 as at the point 62, is the delivery hose 63, likewise provided with a nozzle 64, provided with a valve not shown to prevent drip. The connection 65 between the top of the cylinder 48 and the delivery pipe 60 permits the upper portion of the said cylinder 48 to deliver into the said pipe 60.

It will be observed that the racks 38 and 51 are so disposed as regards their driving pinions 39 and 52 that when one rack ascends the other descends and vice versa.

The operation of this modified form of the invention is as follows:

Supposing the two cylinders 35 and 48 to be filled with liquid as illustrated, and supposing that the piston 36 is ascending. Its upward motion will suck liquid from the tank 1 through the connections 2 and 46 while at the same time it will force liquid out of the delivery pipe 60 into the hose 63 as will be clear from the drawings. On the other hand, as said piston 36 descends, it will force liquid through the pipe 42 into the tank 43, and as the capacity of said cylinder 35 on its downward stroke is slightly more than is sufficient to fill the tank 43 above the top of the overflow pipe 44, each downward stroke of the piston 36 amply maintains the necessary supply of fluid in said tank 43. While said piston 36 is thus descending, the pipe 58 maintains the upper portion of said cylinder 35 full of liquid from the tank 54. It thus results that at each complete stroke of the piston 36, the cylinder 35 is supplied with a predetermined amount of liquid above and below said piston 36. The stroke of this piston 36 is regulated by the screw 27 supported by the member 28 as in the previous case. In the same way, when the piston 36 rises in the manner above disclosed, the piston 49 will descend, thus forcing the liquid below the same up through the pipe 53 into the tank 54. The set screw 30 serves to so regulate the upward stroke of piston 49 that the amount of liquid thus previously sucked in and now forced out of said cylinder 48 will slightly more than fill the tank 54 up above the top of the drain pipe 55. On the other hand, as the piston 36 descends in the manner above disclosed, the piston 49 ascends, and forces out through the connection 65 into the pipe 60 the predetermined quantity of liquid which was filled therein through the pipe 59 from the tank 43.

When the piston 36 descends, the check valve 70 prevents the liquid from being forced back into the tank 1, and the check valve 71 permits liquid to pass up through the pipe 42 into the tank 43, and maintains said pipe 42 full of liquid above said check valve 71. In the same way when the piston 49 descends, the check valve 72 prevents liquid from flowing through the pipe 2 into the tank 1, and the check valve 73 permits liquid to pass upwardly into the pipe 53 and to fill the tank 54 as shown, while at the same time preventing the flow of liquid back into said tank 48, thus maintaining the pipe 53 always full of liquid. When the piston 36 ascends, the check valve 74 prevents liquid from passing back into the tank 54 through the pipe 58, and always maintains said pipe full. In the same way, the check valve 75 permits liquid to pass into the pipe 60 and maintains said pipe 60 normally full. When the piston 49 ascends, the check valve 76 permits liquid to pass into the pipe 60 and prevents liquid from passing from said pipe 60 back into the said tank 48. The check valve 77 prevents liquid from passing up into the pipe 59.

It will thus be clear that in this modified form of the invention, illustrated in Figure 2, the pipes 58 and 59 as well as the pipes 42 and 53 are always kept full of liquid. The same remarks apply to the pipe 60 and hose 63. It therefore follows that any displacements of the pistons 36 and 49 in an upward direction cause an accurate amount of liquid to be delivered through the nozzle 64 to the consumer. It will further be apparent that the measuring chambers above the pistons 36 and 49 act as checks on the measuring tanks 54 and 43 while the pipes 58 and 59 will supply any deficiencies of measure in the same way and for the same reasons as those stated in connection with the operation of the measuring chamber or cylinder 16.

It is obvious that those skilled in the art may vary the details of construction as well as the arrangement of parts without departing from the spirit of the invention, and therefore I do not wish to be limited to the above disclosure except as may be required by the claims.

What is claimed is:

1. In a liquid measuring and dispensing apparatus the combination of a liquid supply; a measuring tank provided with an overflow pipe; a pump of a capacity sufficient to fill said tank until it overflows through said pipe; a drain pipe leading from said overflow pipe back to said supply; a second pump of a predetermined capacity; a pipe leading from said measuring tank to said second pump; and a pipe leading from said last named pump to the point of delivery.

2. In a liquid measuring and dispensing apparatus the combination of a liquid supply; a pair of pump cylinders; a suction connection between one of said cylinders and said supply for drawing a predetermined quantity of liquid from said supply; a measuring tank; a valved connection between one of said cylinders and said tank for delivering said drawn liquid into said tank; a valved connection between said tank and the other of said cylinders for delivering the drawn and measured liquid into the latter; a reciprocating piston in each cylinder; means for reciprocating said pistons simultaneously from the same source of power; and valved means for conducting liquid from said other cylinder to the point of delivery.

3. In a liquid measuring and dispensing apparatus the combination of a liquid supply; a pair of pump cylinders; a suction connection between one of said cylinders and said supply for drawing a predetermined quantity of liquid from said supply; a measuring tank; a valved connection between one of said cylinders and said tank for delivering said drawn liquid into said tank; a valved connection between said tank and the other of said cylinders for delivering the drawn and measured liquid into the latter; a reciprocating piston in each cylinder; adjustable means for limiting the movements of said pistons to govern the volume of their displacements; means for reciprocating said pistons simultaneously from the same source of power; and valved means for conducting liquid from said other cylinder to the point of delivery.

4. In a liquid measuring and dispensing apparatus the combination of a liquid supply; a pair of double acting pump cylinders; a reciprocating piston in each cylinder providing a suction chamber and a delivery chamber in each cylinder; a pair of measuring tanks; a connection between said supply and each suction chamber; a connection between each suction chamber and one of said measuring tanks; adjustable means for limiting the strokes of said pistons; a power shaft; means associated with said shaft for operating said pistons simultaneously; a delivery pipe; connections between said pipe and each delivery chamber; and connections between said measuring tanks and said delivery chambers.

5. In a liquid measuring and dispensing apparatus the combination of a liquid supply; a pair of double acting pump cylinders; a reciprocating piston in each cylinder providing a suction chamber and a delivery chamber in each cylinder; a pair of measuring tanks; provided with overflow means; a valved connection between said supply and each suction chamber; a valved connection between each suction chamber and one of said measuring tanks; adjustable means for limiting the strokes of said pistons; a power shaft; means associated with said shaft for operating said pistons simultaneously in opposite directions; a valved delivery pipe; connections between said pipe and each delivery chamber; and connections between said measuring tanks and said delivery chambers.

In testimony whereof I affix my signature.

RAYMOND CROWDER.